Jan. 16, 1962       J. M. JACOBSON       3,016,932
POWER OPERATED SAW HAVING OPPOSITELY RECIPROCATING BLADES
Filed Aug. 18, 1959

Inventor
JOHN M. JACOBSON
By *[signature]*
Attorney

United States Patent Office 3,016,932
Patented Jan. 16, 1962

3,016,932
POWER OPERATED SAW HAVING OPPOSITELY RECIPROCATING BLADES
John M. Jacobson, Yellowknife, Northwest Territories, Canada
Filed Aug. 18, 1959, Ser. No. 834,437
6 Claims. (Cl. 143—68)

This invention relates to improvements in a power operated saw having oppositely reciprocating blades and appertains particularly to such a saw having separate cutting and raking blades arranged in a novel balanced relation.

Ordinarily the reciprocating, one-blade power saws are difficult to handle because of their kicking action and the tendency of the blade to vibrate and bounce. Attempts have been made to overcome these shortcomings by building a saw with a pair of oppositely reciprocating cutting blades in close, side-by-side relationship but the vibration has not been eliminated, an undesirable thrust and twist has been encountered and the accumulating of sawdust in the cut causes the blades to jamb.

The purpose of the present invention is to correct these deficiencies by providing a power operated saw having a cutting element in the form of a spaced pair of toothed parallel blades and an intermediate toothed raking or clearing blade disposed between and simultaneously reciprocating oppositely to the spaced pair of cutting blades, thus eliminating the kicking, vibration and side drag heretofore encountered.

It is an object of the invention to provide a power operated cross-cut saw of novel multi-blade construction wherein a spaced pair of parallel cutting blades produce a smooth cut on each wall of the kerf whilst an intermediately positioned raking or cleaning blade, reciprocating oppositely to the pair of cutting blades, discharges the sawdust produced.

Another object of the invention is to produce a multi-bladed saw wherein a spaced pair of parallel cutting blades throws the sawdust inwardly and an oppositely reciprocating specially designed and intermediately positioned raking or cleaning blade discharges it from opposite ends of the kerf.

A further object of the invention is to provide a power operated multi-bladed saw of the character described wherein a laterally spaced pair of parallel cutting blades comprise the opposite walls of an inverted U-shaped member and so operate in unison and are counterbalanced for smooth running operation by an oppositely reciprocating and intermediately positioned raking on cleaning blade journalled therebetween in the base of the U.

A further object of the invention is to provide a multi-bladed saw with oppositely reciprocating blades comprising a double bladed member in the form of an inverted U and an intermediate member wherein the latter is guided free from interference with the double bladed arms of the U by a low friction bearing in the base of the U, said double bladed and intermediate members operating in parallel rectilinear planes.

A still further object of the invention is the provision of a power operated multi-bladed saw of the character described wherein the oppositely reciprocating blades and blade bearing are lubricated from the blade-reciprocating mechanism housing.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 1:
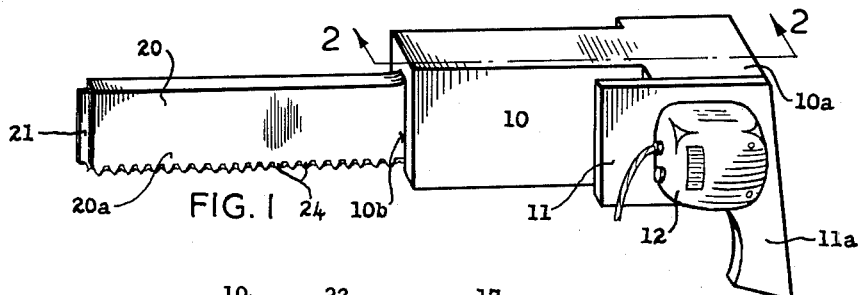
FIGURE 1 is a perspective elevation of the three-bladed saw.
Figure 2:
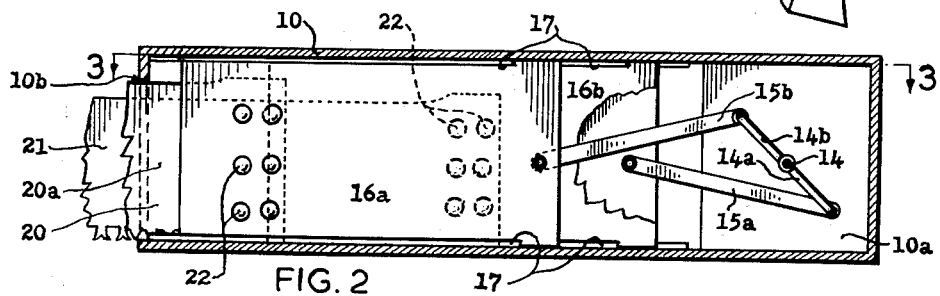
FIGURE 2 is an enlarged vertical sectional detail, showing the blade-reciprocating mechanism, as taken on line 2—2 of FIGURE 1.
Figure 3:
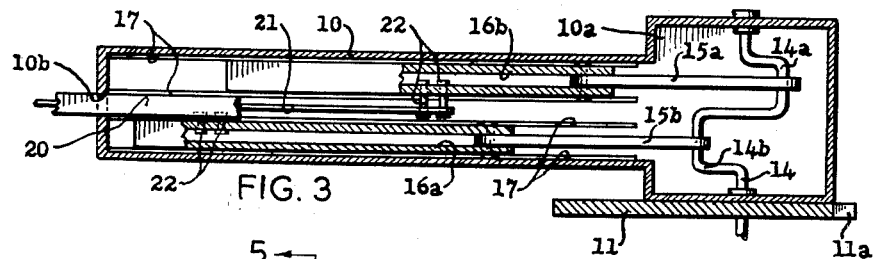
FIGURE 3 is a similar horizontal sectional detail, as taken on line 3—3 of FIGURE 2.
Figures 4, 5:
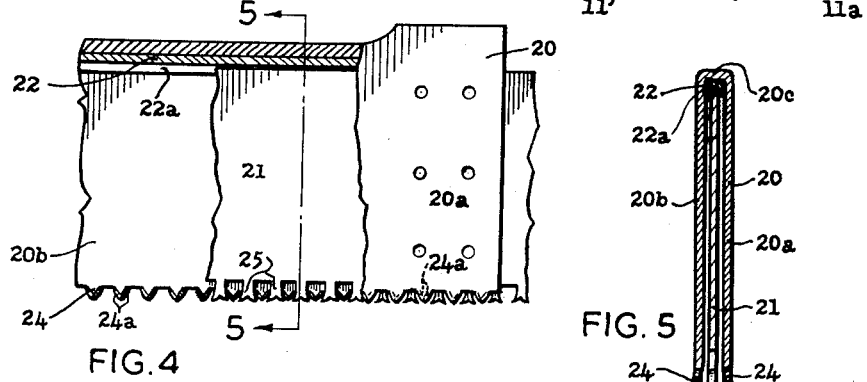
FIGURE 4 is a further enlarged sectional elevational detail of composite blade assembly.
FIGURE 5 is a transverse vertical section thereof as taken on line 5—5 of FIGURE 4.

The simple form of the invention here illustrated includes a housing 10, substantially rectangular in vertical transverse section and also in plan but widened slightly as in a crosshead or T 10a at one end and having a vertical opening 10b in the opposite end.

A mounting plate 11 is applied to one side of the housing's crosshead 10a and supports an electric motor 12 or other prime mover. The plate 11 is shown as provided with a handle 11a in the form of a pistol grip depending therefrom. From the motor 12, a shaft 14 extends transversely through the crosshead of the housing, having a pair of oppositely offset cranks 14a and 14b that connect respectively by connecting rods 15a and 15b with laterally spaced and vertically disposed slide members 16a and 16b that extend longitudinally of the housing 10. A pair of guide rails 17 is provided in the housing 10 for both the top and bottom of each slide member so that on the operation of the motor 12 these slides 16a and 16b are caused to reciprocate oppositely in the housing 10, toward and away from the end with the slot or vertical opening 10b.

The novel multi-blade saw that is employed herein consists of two principal members, namely a double-bladed member 20 comprising a pair of laterally spaced parallel blades 20a and 20b and an intermediate single blade member 21 that slides between the aforementioned pair and reciprocates reversely thereto. These saw blade members 20 and 21 are secured to their respective actuating slides 16a and 16b by connecting means 22 such as pins, rivets or the like. The double bladed member 20 projects outwardly through the vertical opening 10b in the end of the housing, having a close tolerance fit therein, with the single blade member 21 nested therein.

Figure 6:
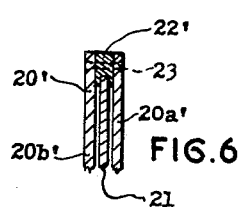
FIGURE 6 is a transverse sectional detail of a slightly modified structure of blade assembly.

The double-bladed member 20 which is formed as an inverted U appears in FIGURES 1 to 5 inclusive, as of one-piece construction with the horizontal base 20c of the U integral with the laterally spaced parallel blades 20a and 20b. An elongated low-friction bearing 22 is secured in the base of the U, extending for the full length of the blade member 20 and having a central longitudinal guide groove 22a for the reception of the upper edge of the single saw blade member 21. In the modified structure shown in section in FIGURE 6, it will be noted that the double-bladed member 20' consists of two individual saw blades 20a' and 20b' with the grooved bearing 22' inserted between them to form the base of the U and to serve as a spacer for the blades, the blades and bearing being suitably united as an assembled unit as by transverse rivets 23.

In the double-bladed saw member 20, its pair of laterally spaced parallel blades 20a and 20b, united in the form of an inverted U and operated in unison are similar cutter blades designed to make smooth walls on opposite sides of the kerf, differing only in that the teeth 24 of each are bevelled as at 24a on their inner or confronting sides so as to throw the sawdust inwards toward or into the path of the single blade intermediate member 21. The single blade of the intermediate member 21 is a raking blade with well shaped deep-cut teeth 25 designed to accommodate sawdust in the spaces therebetween and to discharge it from opposite ends of the kerf.

In use, it will be apparent that with the double-bladed cutting member moving in one direction whilst the intermediate single blade raking member is simultaneously reversely reciprocated in parallel rectilinear planes, vibration, kicking and twisting are virtually eliminated nor is there any drag or jamming from accumulating sawdust in the cut. Because the central raking blade is guided in the groove of the softer metal bearing, for which lubrication may be suitably supplied, and as the double cutting edge relieves pressure on the central blade, there is very little tendency for the central blade to deflect and friction from the two sides of the cut is largely reduced.

From the foregoing description taken in connection with the accompanying drawings, it will be manifest that a power operated saw having oppositely reciprocating blades is provided that will fulfill all the necessary requirements of such a device, but as many changes could be made in the above description and many apparently widely different embodiments of the invention may be constructed within the scope of the appended claims, without departing from the spirit or scope thereof, it is intended that all matters container in the said accompanying specification and drawings shall be interpreted as illustrative and not in a limitative or restrictive sense.

Having thus described the invention, what is claimed as new is:

1. A portable power operated saw having two oppositely reciprocating members, one of said members comprising a unitary pair of toothed laterally spaced parallel blades and the other member being a toothed single blade straddled by the first said member and disposed between the parallel blades thereof, means for guiding said members in parallel rectilinear planes, a motor driven crank shaft having two oppositely offset cranks and a pair of connecting rods respectively connecting said offset cranks with said reciprocating members to cause simultaneous reciprocation thereof in opposite directions.

2. A portable power operated saw having two oppositely reciprocating members, one of said members comprising a pair of integrally connected toothed laterally spaced, parallel cutting blades that work in unison and the other being a toothed raking blade straddled by the parallel bladed member disposed between the parallel blades thereof and reciprocating reversely to said cutting blades, means for guiding said members in parallel rectilinear planes, a motor driven crank shaft having two oppositely offset cranks and a pair of connecting rods respectively connecting said offset cranks with said reciprocating members to cause simultaneous reciprocation thereof in opposite directions.

3. The portable saw as defined in claim 2, wherein the first mentioned two-bladed member is a single unit in the form of an inverted U.

4. The saw as defined in claim 2, wherein the pair of laterally spaced, parallel cutting blades operate in unison to make a single kerf and having teeth bevelled on the confronting sides of the blades and designed to throw sawdust produced thereby inwardly into the path of the intermediate raking blade.

5. The combination with the structure defined in claim 2, of an elongated bearing disposed between the pair of spaced blades of the first mentioned member and running longitudinally thereof remote from the cutting edge and with which said second mentioned straddled member has low friction sliding contact.

6. A portable power operated saw having two oppositely reciprocating members, one of said members comprising a pair of laterally spaced parallel toothed blades in the form of an inverted U, and the other member being a toothed raking blade disposed between the said spaced parallel blades, and an elongated bearing secured to the base of the inverted U, said bearing having a central longitudinal guide groove in which the raking blade has slidable engagement, means for guiding said members in parallel rectilinear planes, a motor driven crank shaft having two oppositely offset cranks and a pair of connecting rods respectively connecting said offset cranks with said reciprocating members to cause simultaneous reciprocation thereof in opposite directions.

References Cited in the file of this patent
UNITED STATES PATENTS

| | | |
|---|---|---|
| 28,223 | Weston | May 8, 1860 |
| 186,742 | Marston | Jan. 30, 1877 |
| 1,491,134 | De Northall | Apr. 22, 1924 |
| 1,537,980 | Asselin | May 19, 1925 |
| 1,789,804 | Broillet | Jan. 20, 1931 |
| 2,740,436 | Woodruff | Apr. 3, 1956 |

FOREIGN PATENTS

| | | |
|---|---|---|
| 472,063 | Canada | Mar. 13, 1951 |